Figures 1, 2:
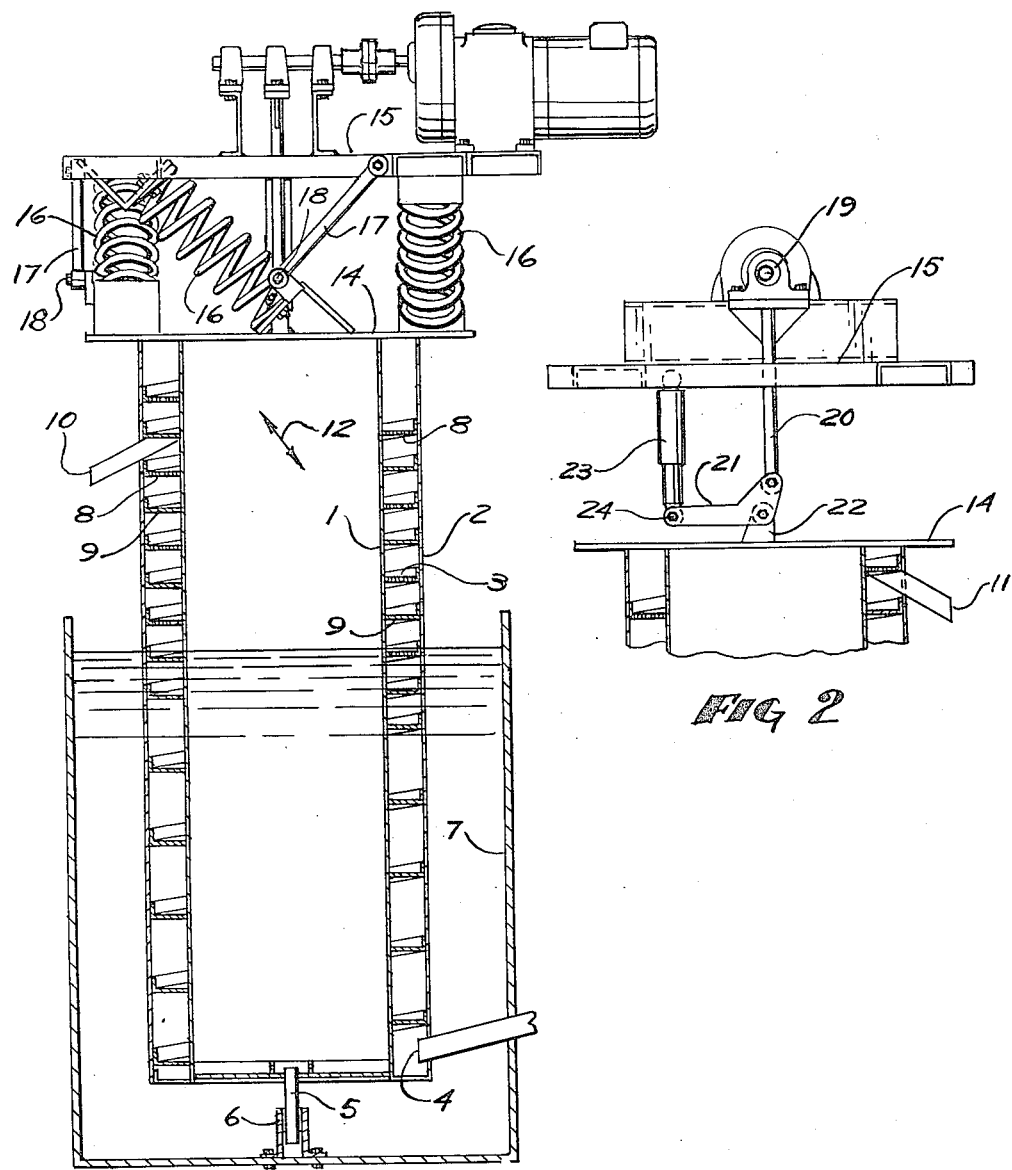

Aug. 28, 1956     R. M. CARRIER, JR     2,760,503

SPIRAL CONVEYORS

Filed June 21, 1952

INVENTOR.
ROBERT M. CARRIER JR.
BY
Oberlin & Limbach
ATTORNEYS

United States Patent Office 2,760,503
Patented Aug. 28, 1956

2,760,503

SPIRAL CONVEYORS

Robert M. Carrier, Jr., Louisville, Ky., assignor to Carrier Conveyor Corporation, Louisville, Ky., a corporation of Kentucky Application June 21, 1952, Serial No. 294,882

7 Claims. (Cl. 134—132)

The present invention relates generally as indicated to spiral conveyors and has for one of its objects the provision of a spiral conveyor which is adapted to be resiliently supported and vibrated from the top thereof so that the lower end portion of the helical conveying pan thereof may be immersed in a tank of liquid which contains the product to be conveyed.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing:

Fig. 1 is a side elevation view showing a preferred embodiment of this invention; and Fig. 2 is a fragmentary elevation view of the upper portion of the conveyor as viewed from the right-hand side of Fig. 1.

Referring now in detail to the drawing, the conveyor comprises concentric tubes 1 and 2 between which is disposed a helical fin 3 constituting a material supporting and conveying pan, there being an intake port 4 at the lower end leading through the outer tube 2 into the space between said concentric tubes. The lower end of the conveyor is provided with a shaft 5 which is reciprocable in a bearing 6 secured to the bottom of the tank 7 which contains liquid to a depth of three feet, for example, and the product which is to be conveyed.

Near the upper end of said pan 3 the bottom wall thereof is perforated as at 8 so that the fines in the product will drop down through said perforations 8 onto an intermediate flight 9 which has a separate discharge conduit 10 for such fines, the product without the fines being discharged from the top end of pan 3 through the discharge conduit 11.

The conveyor is adapted to be vibrated along the path indicated by the line 12 so that when the product and liquid enter through the intake conduit 4, the product will be tossed forwardly and upwardly with respect to said pan 3 and thus will be conveyed upwardly for eventual discharge through the discharge conduit 11 with the fines passing through the perforations 8 and conveyed upwardly by the intermediate pan 9 for discharge through the separate discharge conduit 10.

Vibration of the conveyor along the path 12 is obtained by suspending the conveyor and its top platform 14 from a platform 15 with obliquely disposed coil springs 16 and pivoted rods 17 extending from said platform 15 to the conveyor platform 14 whereby transmission of vertical energy impulses to the conveyor will, through said rods 17 and springs 16, effect a vibration of the conveyor along a generally helical path 12. The longitudinal axes of said springs 16 are preferably disposed generally parallel to such desired path of vibration 12 and the pivotal connections of said rods 17 to the conveyor platform 14 and to the platform 15 are such that the pivots 18 also move along a path generally parallel to such desired path of vibration. The rods 17 are, of course, rubber bushed or arranged otherwise so that the conveyor can partake of the necessary helical vibration.

Vertical energy impulses are transmitted to the center of the conveyor through an eccentric shaft 19 which operates the connecting rod 20, the latter in turn being linked to the conveyor through an intermediate lever 21 which is pivotally connected to the conveyor bracket 22 and pivotally connected to one end of a hydraulic shock absorber 23 or the like. Said shock absorber 23 has its other end pivoted to the platform 15 and provides a fixed pivot 24 at the operating frequency of about 500 cycles per minute, for example. However, said shock absorber 23 may gradually lengthen or shorten to allow said pivot 24 and the conveyor to gradually shift vertically to different positions in accordance with the weight of the conveyor and the load of the material being conveyed. It is to be noted that in the various settled positions of the conveyor the amplitude of the vertical energy impulses will remain substantially constant whereby said shaft 19 may be rotated to impart energy impulses in resonance with the natural frequency of the springs 16.

The liquid which is mixed with the product will, of course, not be conveyed and will rise only from intake 4 according to the surrounding level in the tank 7. Only the granular product and a slight amount of liquid carried thereby is conveyed upward along the pan 3 as the latter is vibrated along the path 12.

The opposite ends of the springs 16 are connected as shown to the top platform 14 of the conveyor and to the platform 15 and therefore said springs are under tension by the weight of the conveyor and the weight of the material thereon.

In order to secure an improved conveying action of the product, the concentric tubes 1 and 2 should be imperforate as shown, except for the opening in tube for the intake 4, and the product should have a substantially greater specific gravity than the liquid so that said product when introduced will proximately settle onto the pan 3, wherefrom it will be progressively tossed angularly upward as the conveyor is vibrated. The product, therefore, will be thoroughly washed or otherwise treated by the alternate up and down movement thereof in the body of the liquid, the liquid which fills the space between the convolutions of said pan 3 being laterally enclosed by tubes 1 and 2 so as to tend to vibrate in unison with the vibrating conveyor.

The product may be introduced through intake 4 from the exterior of tank 7, or if desired, the intake may be in the form of a trough within the tank 7 and having sufficient slope so that the product supplied thereonto will slide down therealong for discharge onto the pan 3. Of course, means may be provided for pushing the product downwardly along the intake 4.

Other modes of applying the principle of the invention may be employed, change being made as regards the details described, provided the features stated in any of the following claims or the equivalent of such be employed.

I therefore particularly point out and distinctly claim as my invention:

1. In a conveyor, the combination of a material supporting pan adapted to be vibrated to toss material thereon angularly upward, a support disposed above said pan, resilient means suspending said pan from said support for vibration as aforesaid, and drive means for imparting vibration to said pan at a frequency substantially equal to the natural frequency of said resilient means and at a predetermined substantially uniform amplitude irrespective of the position to which said pan resiliently settles under its own weight and that of the material thereon, said drive means including an adjustable length link between said drive means and pan to transmit such uniform amplitude vibration to said pan at all settled positions of the latter.

2. The conveyor of claim 1 wherein said adjustable length link comprises a hydraulic shock absorber which allows gradual settling of said pan under load but which constitutes a substantially fixed length link at such natural frequency operation whereby to transmit from said drive means to said pan such uniform amplitude vibration at all settled positions of said pan.

3. In a conveyor, the combination of a helical material supporting pan adapted to be vibrated to toss material thereon angularly upwardly, a support disposed above said pan, suspension means including obliquely arranged springs and guide means, said springs being connected to said support and to said pan for suspending said pan for vibration as aforesaid, said guide means being disposed to guide the vibration of said pan along a path of greater helix angle than that of said pan, and impulse generating means carried by said support and operatively connected to said pan for vibrating the latter.

4. The conveyor of claim 3 wherein said guide means comprises rod-like members pivotally connected at their opposite ends to said support and to said pan respectively and extending obliquely therebetween so that the paths of movement of the ends of said members which are connected to said pan are generally parallel to such desired path of vibration of said pan.

5. The conveyor of claim 3 wherein said impulse generating means comprises an eccentric driven link, an extensible link connected at one end to said support, a lever pivotally connected at its ends to the other end of said extensible link and to said eccentric driven link and intermediate its ends to said pan, said extensible link being so disposed that said pan may settle under its own weight and that of the material thereon while substantially constant stroke vibration is transmitted from said eccentric driven link and through said lever to said pan.

6. The conveyor of claim 5 wherein said extensible link comprises a hydraulic shock absorber which, at the frequency of operation of said eccentric driven link, constitutes a fixed length link but which allows gradual settling of said pan under different loads.

7. In combination, a helical material supporting pan disposed about a generally vertical axis; a tank containing a mixture of liquid and conveyable material in which the lower end portion of said pan is immersed; a support disposed above the upper end of said pan; resilient suspension means comprising coil springs extending obliquely between and connected at their opposite ends to said support and to said pan, and rod-like members extending obliquely between and pivotally connected at their opposite ends to said support and to said pan, said members further being disposed obliquely relative to the axes of said springs whereby to provide lateral support to said springs while permitting vibration of said pan along a helical path which is generally parallel to the axes of said springs and which is of helix angle greater than that of said pan to thus convey material upwardly around said pan from such liquid-material mixture, and impulse-generating means carried by said support and operatively connected to said pan for vibrating the latter as aforesaid.

References Cited in the file of this patent

UNITED STATES PATENTS

| 429,147 | Mosher | June 3, 1890 |
| 1,061,141 | Tebyrica | May 6, 1913 |
| 2,374,664 | Carrier | May 1, 1945 |
| 2,464,216 | Devol | Mar. 15, 1949 |
| 2,618,577 | Bash | Nov. 18, 1952 |
| 2,662,851 | Jones | Dec. 15, 1953 |

FOREIGN PATENTS

| 394,460 | Germany | May 1, 1924 |
| 647,150 | Great Britain | Dec. 6, 1950 |